United States Patent [19]

Roethlingshoefer et al.

[11] Patent Number: 5,525,943
[45] Date of Patent: Jun. 11, 1996

[54] ELECTROMAGNETIC COMPATIBILITY FILTER UTILIZING INHERENTLY FORMED CAPACITANCE

[75] Inventors: Walter Roethlingshoefer, Reutlingen; Kurt Weiblen, Metzingen; Peter Tauber, Rottenburg; Uwe Lipphardt, Reutlingen, all of Germany

[73] Assignee: Robert Bosch GmbH, Stuttgart, Germany

[21] Appl. No.: 223,071

[22] Filed: Apr. 4, 1994

[30] Foreign Application Priority Data

Apr. 2, 1993 [DE] Germany ................. 43 10 860.1

[51] Int. Cl.⁶ .................................................. H03H 7/00
[52] U.S. Cl. .................................. 333/185; 333/202
[58] Field of Search .................. 333/24 C, 185, 333/202, 204; 174/35 R, 51; 361/523, 816

[56] References Cited

U.S. PATENT DOCUMENTS

| | | | |
|---|---|---|---|
| 4,782,310 | 11/1988 | Saburi et al. | 333/185 |
| 4,791,391 | 12/1988 | Linnell et al. | 333/185 |
| 4,814,946 | 3/1989 | Su | 361/523 |
| 4,821,005 | 4/1989 | Kling | 333/185 |
| 4,931,754 | 6/1990 | Moussie | 333/185 |
| 4,945,323 | 7/1990 | Gerstenberg et al. | 333/185 |
| 4,967,316 | 10/1990 | Goebel et al. | |
| 5,055,635 | 10/1991 | Landsmann et al. | 333/244 |
| 5,113,155 | 5/1992 | Funada | 331/107 |
| 5,150,086 | 9/1992 | Ito | 333/185 |
| 5,167,539 | 12/1992 | Okamoto et al. | 333/185 |
| 5,300,903 | 4/1994 | Okamura et al. | 333/185 |
| 5,351,020 | 9/1994 | Okamura et al. | 333/175 |
| 5,374,907 | 12/1994 | Orita et al. | 333/185 |

FOREIGN PATENT DOCUMENTS

| | | |
|---|---|---|
| 3837206A1 | 5/1990 | Germany . |
| 2215194 | 9/1990 | Japan . |
| 0458601 | 2/1992 | Japan . |

*Primary Examiner*—Benny Lee
*Assistant Examiner*—Darius Gambino
*Attorney, Agent, or Firm*—Kenyon & Kenyon

[57] ABSTRACT

An electromagnetic compatibility (EMC) filter used in a hybrid technology circuit component, having current-carrying lines and a ground conductor, for protection against electromagnetic interference. The current-carrying lines and ground conductor are arranged on a ceramic plate. The current-carrying lines are covered by a dielectric, which in turn, is covered by an upper metal screen in electrical contact with the ground conductor. A lower metal screen is arranged on the ceramic plate beneath the current-carrying lines and is in electrical contact with the ground conductor.

6 Claims, 2 Drawing Sheets

ELECTROMAGNETIC COMPATIBILITY FILTER UTILIZING INHERENTLY FORMED CAPACITANCE

FIELD OF THE INVENTION

The present invention relates to an electromagnetic compatibility (EMC) filter used in hybrid technology circuits. More specifically, the present invention relates to an EMC filter used in a hybrid component having current-carrying lines and a ground conductor.

BACKGROUND OF THE INVENTION

It is generally known to protect electric or electronic devices or circuits from line-conducted electromagnetic irradiation. For this purpose, interference-suppression capacitors are provided, for example, which are connected via a mass frame ground connection to the circuit arrangement and via a compression spring to a metal housing. A disadvantage of this known configuration is that, as mechanical parts, the mass springs require space. Moreover, aging of the parts can cause the spring contact to the housing to deteriorate. Also, because of the long path between the interference-suppression capacitor and the ground connection part, emission of interference signals can still occur.

It is further known to use an electrically conductive adhesive agent between the circuit arrangement and the housing to provide capacitive coupling. German Unexamined Patent Application No. 38 37 206 describes using an adhesive agent to couple a discrete interference-suppression capacitor, situated on a circuit board, to a grounded metallic housing through a dielectric layer, thereby creating a capacitive coupling to the housing that is in series with the discrete capacitor on the circuit board. Although this arrangement offers a sufficiently high-frequency coupling of a circuit to ground, it cannot be used for hybrid circuits and, in any case, requires an electrically conductive housing. Moreover, the additional arrangement of a chip capacitor is needed.

SUMMARY OF THE INVENTION

The present invention provides an EMC filter for use in hybrid technology circuits, which guarantees effective protection against high-frequency and low-frequency interference without requiring additional components.

It was discovered that when current-carrying lines are surrounded by a dielectric material and a metal screen which is connected to a ground conductor and is arranged on a ceramic plate, an arrangement approaching that of a plurality of capacitors having extremely low inductance can be achieved. As a result, effective EMC protection is achieved inexpensively using standard technology.

The present invention logically combines the elements of hybrid technology to provide EMC protection. For example, costly bushing-type capacitors and coaxial cables can be imitated and replaced by hybrid technology circuit arrangements in accordance with the present invention.

DETAILED DESCRIPTION OF THE DRAWINGS

Figure 1:
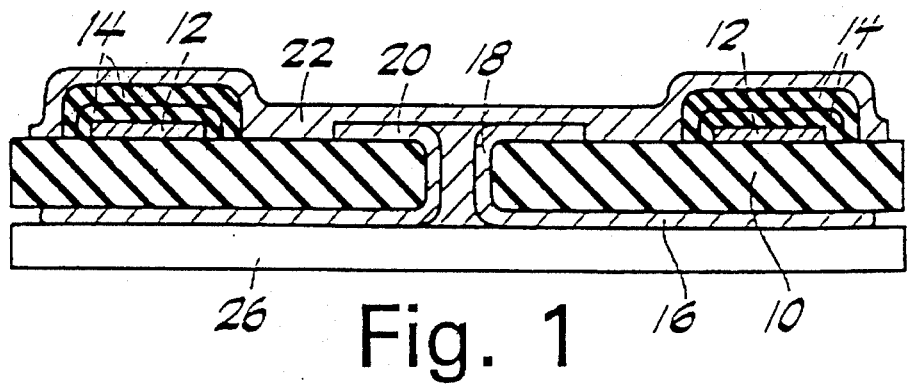
FIG. 1 is a cross-sectional view of a first embodiment of a hybrid component in accordance with the present invention.

FIG. 1 is a cross-sectional view of a hybrid component comprising a ceramic plate 10, and two current-carrying lines 12 situated on an upper surface of the ceramic plate 10. The current-carrying lines 12 are surrounded by a dielectric 14. On a bottom surface of the ceramic plate 10, the hybrid component comprises a metal screen 16, which is connected via a plated-through hole 18 to a ground conductor 20. An additional metal screen 22, which covers the dielectric 14 and the ground conductor 20, is arranged on the upper side of the hybrid component. The metal screen 22 is electroconductively connected to the ground conductor 20.

The entire hybrid component is mounted on a housing part 26, which can serve at the same time as a cooling part, and if it is a metal housing, as ground.

In conjunction with the current-carrying lines 12 and the dielectric 14, the metal screen 22 forms a plurality of capacitors having extremely low inductance and, because of the relatively thin dielectric 14, having relatively high capacitance. Due to the capacitive coupling of the current-carrying lines 12 to the ground conductor 20, the effect of interference-suppression capacitors is achieved, so that high-frequency coupling of the circuit to ground, and thus reliable interference suppression, is made possible.

Figure 2:
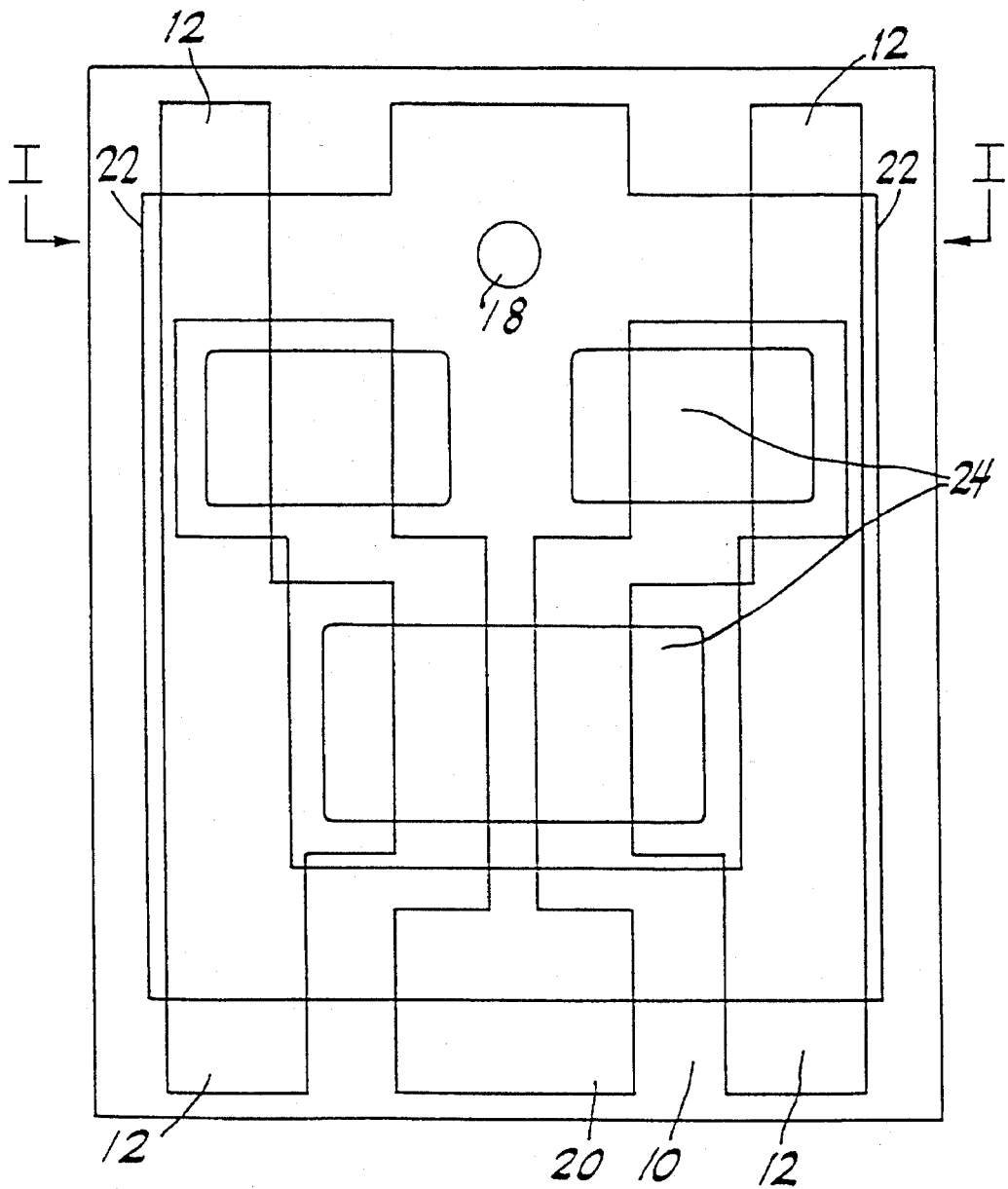
FIG. 2 is a top view of the hybrid component of FIG. 1.

FIG. 2 is a top view of the hybrid component whose cross-section is shown in FIG. 1. The view in FIG. 1 corresponds to the cross-section I—I indicated in FIG. 2. As shown in FIG. 2, discrete ceramic chip capacitors 24 are also arranged on the hybrid component. The ceramic chip capacitors 24 offer additional capacitive coupling of the current-carrying lines 12 to the ground conductor 20. This capacitive coupling protects the circuit from low-frequency interference. As such, a combination of both types of capacitive coupling provides the current-carrying lines 12 with highly effective protection against the entire spectrum of line-conducted interference.

Moreover, by having a shortest possible binding of the discrete ceramic chip capacitors 24, disturbing inductance is avoided. A completely symmetrical coupling enables opposite-phase interferences to be completely eliminated.

Figure 3:
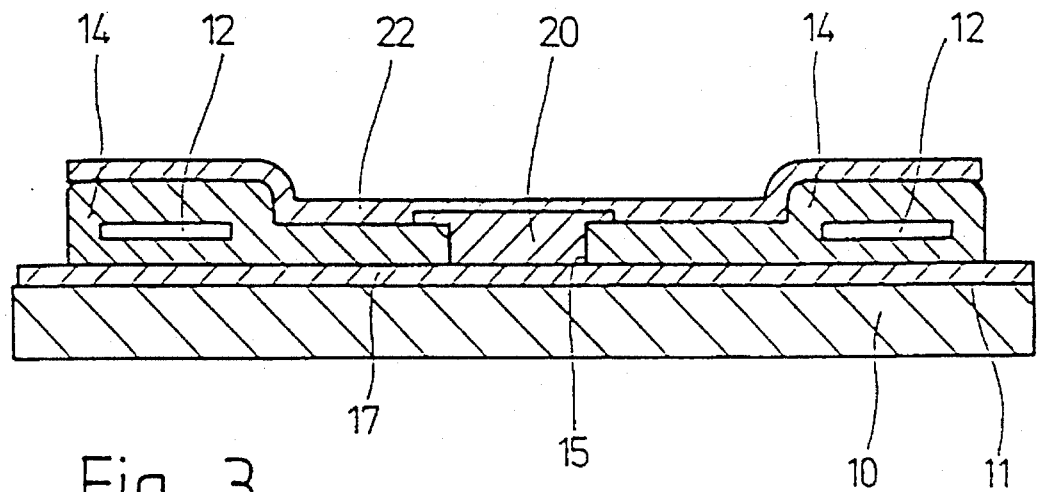
FIG. 3 is a cross-sectional view of a second embodiment of a hybrid component in accordance with the present invention.

FIG. 3 is a cross-sectional depiction of a second embodiment of a hybrid component in accordance with the present invention. (Like parts in common with the embodiment of FIG. 1 are shown with the same reference numerals.) On its top surface 11, the ceramic plate 10 has a metal shield 17, on which the current-carrying lines 12 are arranged, separated from the metal shield 17 by the dielectric 14. The ground conductor 20 is electroconductively connected to the metal shield 22 covering the dielectric 14. Furthermore, the ground conductor 20 also electrically contacts the metal screen 17 through a cut-out 15 in the dielectric 14.

As mentioned above with respect to FIG. 1, by means of the electrically conductive connection to the ground conductor 20 and, thus, to the metal screen 17, and together with the current-carrying lines 12 and the dielectric 14, the metal screen 22 forms a plurality of capacitors having extremely low inductance and relatively high capacitance.

As explained above with respect to FIGS. 1 and 2, discrete ceramic chip capacitors 24 (not shown in FIG. 3), which offer additional capacitive coupling of the current-carrying lines 12 to the ground conductor 20, can also be arranged on the hybrid component of FIG. 3.

Figure 4:
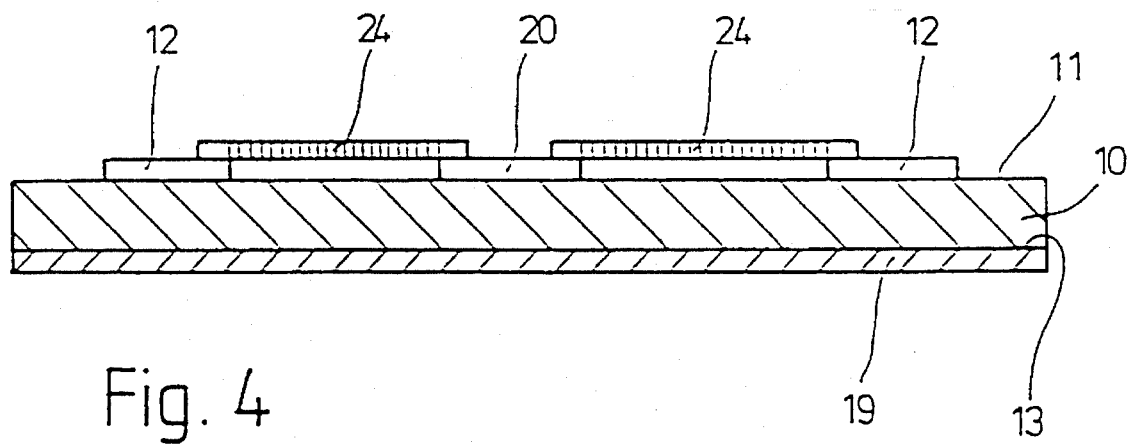
FIG. 4 is a cross-sectional view of a third embodiment of a hybrid component in accordance with the present invention.

FIG. 4 is a cross-sectional view of a third embodiment of a hybrid component in accordance with the present invention. In this embodiment, a metal screen 19 is arranged on the bottom side 13 of the ceramic plate 10. The current-carrying lines 12 and the ground conductor 20 are arranged on the top side 11 of the ceramic plate 10. The current-carrying lines 12 are capacitively coupled via discrete ceramic chip capacitors 24 to the ground conductor 20.

In the embodiment of FIG. 4, the metal screen 19, together with the current-carrying lines 12 and the ceramic plate 10, constitute a capacitive coupling of the current-carrying lines 12 to the metal screen 19. The ceramic chip capacitors 24 provide additional capacitive coupling of the current-carrying lines 12 to the ground conductor 20.

Overall therefore, the above-disclosed embodiments make it possible to flexibly adapt protective arrangements to each application-specific EMC problem. In particular, an optimal result can be achieved by variably fitting the discrete ceramic chip capacitors 24 with components for the low frequency range and by applying dielectric pastes having different values to vary the printed capacitors for the upper frequency range.

What is claimed is:

1. An electromagnetic compatibility filter for use on a hybrid component having current-carrying lines and a ground conductor arranged on an upper surface of a ceramic plate, the filter comprising:

a dielectric covering the current-carrying lines;

a lower metal screen in electrical contact with the ground conductor and arranged on the ceramic plate beneath the current-carrying lines; and an upper metal screen covering the dielectric and being in electrical contact with the ground conductor, wherein the current-carrying lines are electrically insulated from the upper and lower metal screens.

2. The filter according to claim 1, wherein the lower metal screen is arranged on a bottom surface of the ceramic plate.

3. The filter according to claim 2, wherein the lower metal screen is connected via a plated-through hole to the ground conductor.

4. The filter according to claim 1, wherein the lower metal screen is arranged on the upper surface of the ceramic plate and is separated from the current-carrying lines by the dielectric.

5. The filter according to claim 1, wherein the hybrid component includes at least one discrete ceramic chip capacitor having one contact connected to the current-carrying lines and another contact connected to the ground conductor.

6. The filter according to claim 5, wherein the hybrid component includes at least two discrete ceramic chip capacitors in a symmetrical arrangement.

* * * * *